(12) United States Patent
Wang et al.

(10) Patent No.: US 11,468,280 B2
(45) Date of Patent: Oct. 11, 2022

(54) TWO-DIMENSIONAL CODE BASED COMMUNICATION METHOD, APPARATUS, AND LIFT DESK

(71) Applicant: ZHEJIANG JIECANG LINEAR MOTION TECHNOLOGY CO., LTD., Zhejiang (CN)

(72) Inventors: Hanshuo Wang, Zhejiang (CN); Botao Li, Zhejiang (CN); Chenqi Yang, Zhejiang (CN)

(73) Assignee: ZHEJIANG JIECANG LINEAR MOTION TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 16/844,957

(22) Filed: Apr. 9, 2020

(65) Prior Publication Data

US 2020/0327386 A1 Oct. 15, 2020

(30) Foreign Application Priority Data

Apr. 10, 2019 (CN) .......................... 201910282814.1

(51) Int. Cl.
*G06K 19/06* (2006.01)
*H04W 4/80* (2018.01)
(Continued)

(52) U.S. Cl.
CPC ... *G06K 19/06037* (2013.01); *G06F 16/9554* (2019.01); *G06K 7/1417* (2013.01); *H04W 4/80* (2018.02)

(58) Field of Classification Search
CPC . G06K 19/06037; G06K 7/1417; H04W 4/80; G06F 16/9554
(Continued)

(56) References Cited

U.S. PATENT DOCUMENTS

| | | | |
|---|---|---|---|
| 2018/0288817 A1* | 10/2018 | Windorfer | H04W 76/11 |
| 2019/0166392 A1* | 5/2019 | Eyer | H04N 21/2541 |
| 2021/0390846 A1* | 12/2021 | Arling | G08C 17/02 |

* cited by examiner

*Primary Examiner* — Ahshik Kim
(74) *Attorney, Agent, or Firm* — JCIPRNET

(57) ABSTRACT

Disclosed are a two-dimensional code based communication method, a two-dimensional code based communication apparatus, and a two-dimensional code based lift desk, wherein the communication method comprises: acquiring, by a controller, address information of a communication module, and transmitting the address information, together with product information, to a displaying module; generating, by the displaying module, a two-dimensional code based on the address information and the product information, and displaying, by the displaying module, the two-dimensional code; and scanning, by a smart terminal, the displayed two-dimensional code to establish communication with the communication module. The present disclosure may achieve the following effects: upon connecting with the communication module via the smart terminal, it becomes unnecessary to search all surrounding communication modules and then select one to connect; instead, the present disclosure ensures an accurate connection by directly scanning the two-dimensional code, which prevents misconnection and facilitates the user to use; besides, the two-dimensional code is displayed via the displaying module, which avoids aging or loss of the two-dimensional code.

8 Claims, 2 Drawing Sheets acquire, by a controller, address information of a communication module, and transmit the address information, together with product information, to a displaying module — S1 generate, by the displaying module, a two-dimensional code based on the address information and the product information; and display, by the displaying module, the two-dimensional code — S2 scan, by a smart terminal, the displayed two-dimensional code to establish communication with the communication module — S3

(51) Int. Cl.
*G06F 16/955* (2019.01)
*G06K 7/14* (2006.01)

(58) Field of Classification Search
USPC .......................................................... 235/494
See application file for complete search history.

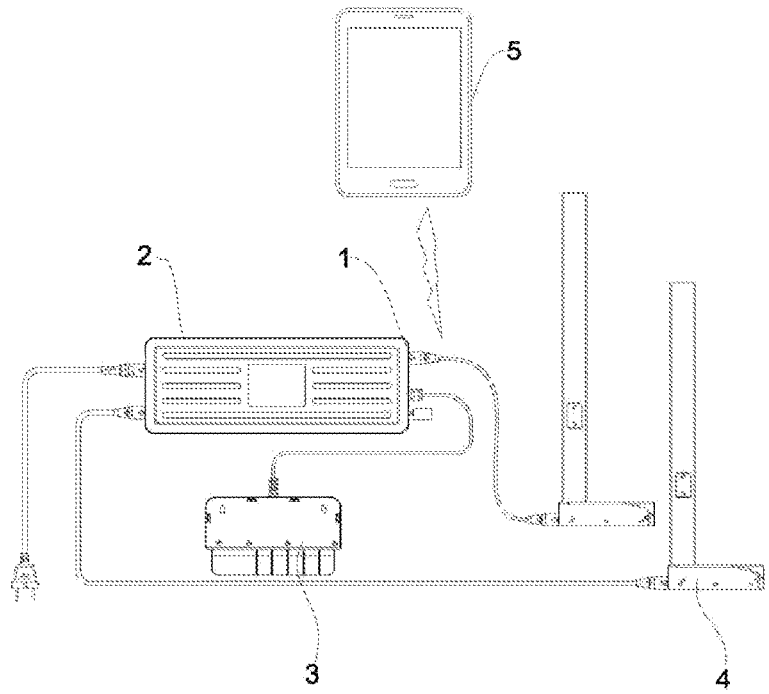
FIG. 1
FIG. 2
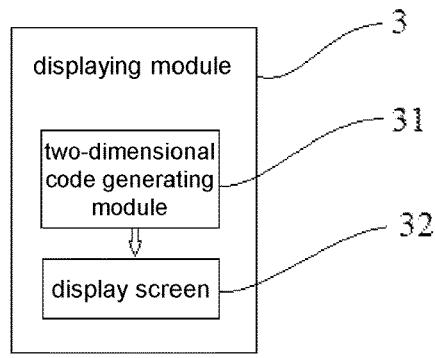
FIG. 3

TWO-DIMENSIONAL CODE BASED COMMUNICATION METHOD, APPARATUS, AND LIFT DESK

CROSS-REFERENCE TO RELATED APPLICATION

This application claims the priority benefit of China application serial no. 201910282814.1, filed on Apr. 10, 2019. The entirety of the above-mentioned patent application is hereby incorporated by reference herein and made a part of this specification.

BACKGROUND

Technical Field

Embodiments of the present disclosure generally relate to the field of communication technology, and more particularly relate to a two-dimensional code based communication method, a two-dimensional code based communication apparatus, and a two-dimensional code based lift desk.

Description of Related Art

Smart home is an implementation of IoT (Internet of Things). The smart home may connect, via the IoT, various facilities (such as audio and video equipment, lighting system, curtain control, air-conditioner control, security system, digital theater system, video server, video cabinet system, networked home appliances) in a house, to provide various functions and means such as home appliance control, lighting control, telephone remote control, indoor and outdoor remote control, anti-theft alarm, environment surveillance, HVAC (heating, ventilation, and air conditioning) control, infrared repeating, and programmable timing control, etc. Compared with conventional home, the smart home not only has a traditional living function, but also offers all-round information interaction functions for the building, network communication, information appliance, and device automation, which further saves various energy bills.

Likewise, in the smart medical field, a smart terminal may also implement, via a connection between a communication module and a medical apparatus, smart control of the medical apparatus.

Conventionally, irrespective of in the smart home field or in the smart medical field, upon connection with a communication module, a smart terminal needs to search all networks surrounding a communication module and then selects a corresponding network to establish communication with the communication module; however, during the connection process, the smart terminal is easily connected to a wrong communication module.

SUMMARY

To solve the problems above, the present disclosure provides a two-dimensional code based communication method, a two-dimensional code based communication apparatus, and a two-dimensional code based lift desk, wherein a smart terminal scans a two-dimensional code on a displaying module to implement communication with a controller, thereby avoiding connection with a wrong communication module.

In a first aspect, the present disclosure provides a two-dimensional code based communication method, comprising:

acquiring, by a controller, address information of a communication module, and transmitting the address information, together with product information, to a displaying module;

generating, by the displaying module, a two-dimensional code based on the address information and the product information, and displaying, by the displaying module, the two-dimensional code; and scanning, by a smart terminal, the displayed two-dimensional code to establish communication with the communication module.

Preferably, the controller acquires the address information of the communication module, and when the address information of the communication module is updated, re-transmits the updated address information and the product information to the displaying module so as to update the two-dimensional code.

Preferably, when the smart terminal establishes the communication with the communication module, the controller acquires the number of smart terminals in communicative connection with the communication module; when the number of smart terminals is greater than a set connection threshold, the controller controls the displaying module not to display the two-dimensional code.

Preferably, when the smart terminal establishes the communication with the communication module, the controller starts recording a communication duration between the smart terminal and the communication module; when the communication duration is greater than a set communication duration, the controller controls the communication module to disconnect with the smart terminal.

Preferably, when the smart terminal establishes the communication with the communication module, the controller acquires, via the communication module, user information of the smart terminal, and searches, in a user information library, the user information; if identical user information is found, the smart terminal is allowed to control the controller via the communication module; if no identical user information is found, the smart terminal is not allowed to control the controller via the communication module.

In a second aspect, the present disclosure provides a two-dimensional code based communication apparatus, the communication apparatus being connected to an actuating apparatus of a smart device, the communication apparatus comprises:

a communication module configured for establishing communication with the actuating apparatus of the smart device;

a controller configured for acquiring address information of the communication module and transmitting the address information, together with product information, to a displaying module; and the displaying module configured for generating a two-dimensional code based on the address information and the product information and displaying the two-dimensional code, wherein the two-dimensional code is adapted for a smart terminal to scan so as to establish the communication with the communication module.

Preferably, the controller acquires the address information of the communication module, and when the address information of the communication module is updated, re-transmits the updated address information and the product information to the displaying module so as to update the two-dimensional code.

Preferably, the controller comprises a counter, wherein when the smart terminal establishes the communication with the communication module, the counter acquires the number of smart terminals in communicative connection with the communication module; when the number of smart terminals is greater than a set connection threshold, the controller controls the displaying module not to display the two-dimensional code.

Preferably, the controller comprises a timer for timing the communication between the smart terminal and the communication module, wherein when the smart terminal establishes communication with the communication module, the timer starts recording a communication duration between the smart terminal and the communication module; when the communication duration is greater than a set communication duration, the controller controls the communication module to disconnect with the smart terminal.

Preferably, the controller comprises a storing module configured for storing a user information library recording user information, wherein when the smart terminal establishes the communication with the communication module, the controller acquires, via the communication module, user information of the smart terminal, and searches, in the user information library, the user information; if identical user information is found, the smart terminal is allowed to control the controller via the communication module; if no identical user information is found, the smart terminal is not allowed to control the controller via the communication module.

In a third aspect, the present disclosure provides a two-dimensional code based lift desk, comprising: a desktop, a lift column connected to the desktop, and an actuating apparatus actuating the lift column to move vertically, and further comprising a smart terminal, and a controller, a displaying module, and a communication module arranged on the desktop, wherein the smart terminal is configured for acquiring product information after scanning a two-dimensional code displayed on the displaying module to establish communication with the communication module, and is further configured for transmitting a control instruction via the communication module to the controller to control the actuating apparatus.

The present disclosure may achieve the following effects: upon connecting with the communication module via the smart terminal, it becomes unnecessary to search all surrounding communication modules and then select one to connect; instead, the present disclosure ensures an accurate connection by directly scanning the two-dimensional code, which prevents misconnection and facilitates the user to use; besides, the two-dimensional code is displayed via the displaying module, which avoids aging or loss of the two-dimensional code.

BRIEF DESCRIPTION OF THE DRAWINGS

Hereinafter, the present disclosure will be described in further detail through preferred embodiments with reference to the accompanying drawings.

FIG. 1 is a flow diagram of a two-dimensional code based communication method according to an embodiment of the present disclosure;

FIG. 2 is a structural schematic diagram of a two-dimensional code based communication apparatus according to an embodiment of the present disclosure;

FIG. 3 is a structural schematic diagram of a displaying module in a two-dimensional code based communication apparatus according to an embodiment of the present disclosure;

DETAILED DESCRIPTION OF EMBODIMENTS

Figure 4:
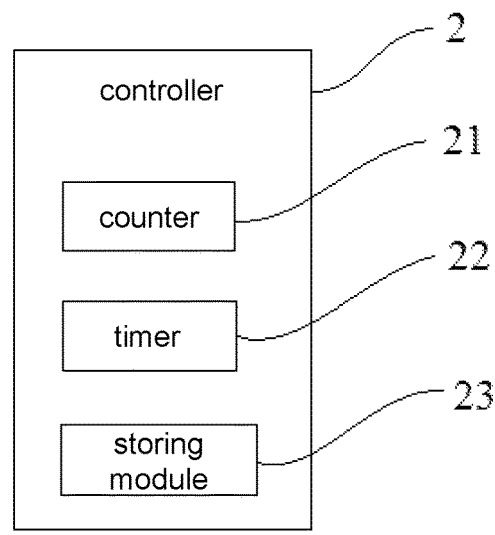
FIG. 4 is a structural schematic diagram of a controller in a two-dimensional code based communication apparatus according to an embodiment of the present disclosure.

Hereinafter, the technical solutions of the present disclosure will be further described with reference to the accompanying drawings. It should be noted that the present disclosure is not limited to these embodiments.

A basic idea of the present disclosure is to acquire, by a controller, address information of a communication module, transmit the address information, together with product information, to a displaying module, and to generate and display, by the displaying module, a two-dimensional code based on the address information and the product information, and then scan, by a smart terminal, the displayed two-dimensional code to establish communication with the communication module. The two-dimensional code is displayed by the displaying module, which avoids aging or loss of the two-dimensional code.

An embodiment of the present disclosure provides a two-dimensional code based communication method, as shown in FIG. 1, comprising:

S1: acquiring, by a controller, address information of a communication module, and transmitting the address information, together with product information, to a displaying module;

S2: generating, by the displaying module, a two-dimensional code based on the address information and the product information, and displaying, by the displaying module, the two-dimensional code; and S3: scanning, by a smart terminal, the displayed two-dimensional code to establish a communication with the communication module.

In this embodiment, the communication module includes various existing wireless communication modules such as a Bluetooth communication module, a 4G communication module, a 5G communication module, or a LORA communication module, etc. The address information of each communication module is unique, such that the generated two-dimensional code is also unique, thereby avoiding a circumstance of connecting with multiple communication modules when scanning one two-dimensional code. Upon connecting with the communication module, it is unnecessary for the smart terminal to search all surrounding communication modules and then select one to connect; instead, the present disclosure ensures an accurate connection by directly scanning the two-dimensional code, which prevents misconnection and facilitates the user to use.

The displaying module receives the address information as well as the product information, generates a two-dimensional code based on a two-dimensional code generating technology, and displaying the two-dimensional code on a display screen.

The product information includes: manufacturer information, status information of the smart device, and manufacture information of the smart device, etc. After scanning the two-dimensional code, the smart terminal parses the two-dimensional code to acquire, whilst connecting with the communication module, the manufacturer information, the status information of the smart device, and the manufacture information of the smart device as recorded in the two-dimensional code. In this embodiment, the smart terminal includes a smart mobile phone and like devices, which may parse the scanned two-dimensional code and may communicate with the communication module.

In the case that the communication module is damaged or upgraded, it is needed to change or upgrade the original communication module; after the change or upgrade, its address information also changes, such that if the two-dimensional code is not updated at this point, the smart terminal cannot establish communication with the new or upgraded communication module by scanning the two-dimensional code. To implement establishment of the communication between the smart terminal and the new or upgraded communication module, the controller transmits an instruction manually or automatically at a certain interval to acquire the address information of the communication module and compares the current address information with the last stored address information; if the current address information is different from the last stored address information, it is needed to update the address information of the communication module, and re-transmit the updated address information and the product information to the displaying module so as to update the two-dimensional code; and if the current address information is identical to the last stored address information, the address information of the communication module is not updated.

Due to the limit of communication transmission rate and out of the consideration of user privacy, the controller imposes a limit to the number of connections of smart terminals; when the number of connections reaches a set connection threshold, the controller controls the displaying module not to display the two-dimensional code. Specifically, when the smart terminal establishes communication with the communication module, the controller acquires the number of smart terminals in communicative connection with the communication module and compared the number of smart terminals with a set connection threshold; when the number of smart terminals greater than the set connection threshold, the controller controls the displaying module not to display the two-dimensional code. The set connection threshold may be manually set based on actual needs.

Due to limit of user connection duration, when the smart terminal establishes communication with the communication module, the controller enables a timing function to record the communication duration between the smart terminal and the communication module; when the communication duration is greater than a set communication duration, the controller controls the communication module to disconnect with the smart terminal. When the smart terminal re-establishes communication with the communication module, the controller restarts timing.

To avoid establishment of communication between an abnormal user and the communication module, in one embodiment, user information on the smart terminal to be connected to the communication module is verified, and the smart terminal is only allowed to transmit a control instruction to the controller upon pass of the verification. Specifically, when the smart terminal establishes communication with the communication module, the controller acquires, via the communication module, the user information of the smart terminal, and searches, in a user information library, the user information; if identical user information is found, the smart terminal is allowed to control the controller via the communication module; if no identical user information is found, the smart terminal is not allowed to control the controller via the communication module.

It needs to be noted that when setting up a user information library, it is needed to back up the smart terminal allowed to transmit a control instruction to the controller, i.e., storing the user information of the smart terminal into the user information library; the user information library allows deleting, adding, or modifying the stored user information.

On the basis of the two-dimensional code based communication method, an embodiment of the present disclosure further provides a two-dimensional code based communication apparatus, the communication apparatus being connected to an actuating apparatus 4 of a smart device. As shown in FIG. 2, the apparatus comprises: a communication module 1 configured for establishing communication with an actuating apparatus 4 of the smart device; a controller 2 configured for acquiring address information of the communication module 1, and transmitting the address information, together with product information, to a displaying module 3; the displaying module 3 is configured for generating a two-dimensional code based on the address information and the product information and displaying the two-dimensional code, the two-dimensional code being adapted to a smart terminal 5 to scan so as to establish communication with the communication module.

In this embodiment, the communication module 1 includes various existing wireless communication modules such as a Bluetooth communication module, a 4G communication module, a 5G communication module, or a LORA communication module, etc.

The controller 2 refers to a control device which controls actuation, speed adjustment, braking, and reverse rotation of an electric motor by changing a wiring of a main circuit or a control circuit according to a predetermined sequence and changing a resistance value in the circuit. The controller comprises a program counter, an instruction register, an instruction decoder, a time sequence generator, and an operation controller, which is a "decision mechanism" issuing commands, i.e., coordinating and commanding the operations of the whole computer system.

In this embodiment, as shown in FIG. 3, the displaying module 3 comprises a two-dimensional code generating module 31 and a display screen 32. The two-dimensional code generating module 31 generates a two-dimensional code based on the address information and the product information and transmits the generated two-dimensional code to the display screen 32 which displays the two-dimensional code.

The controller 2 acquires the address information of the communication module manually or automatically every certain interval, and when the address information of the communication module 1 is updated, re-transmits the updated address information and the product information to the displaying module 3 so as to update the two-dimensional code.

As shown in FIG. 4, the controller 2 comprises a counter 21, wherein when the smart terminal 5 establishes communication with the communication module 1, the counter 21 acquires the number of smart terminals in communicative connection with the communication module 1 and compares the number of connected smart terminals with a set connection threshold; when the number of connected smart terminals is greater than the set connection threshold, the controller 2 controls the displaying module 3 not to display the two-dimensional code.

The controller 2 comprises a timer 22 for timing a connection between the smart terminal 5 and the communication module 1, wherein when the smart terminal 5 establishes communication with the communication module 1, the timer 22 starts recording a communication duration between the smart terminal 5 and the communication module 1; when the communication duration is greater than a set communication duration, the controller 2 controls the communication module 1 to disconnect with the smart terminal 5.

The controller 2 comprises a storing module 23 configured for storing a user information library recording user information, wherein when the smart terminal 5 establishes communication with the communication module 1, the controller 2 acquires, via the communication module 1, user information of the smart terminal 5, and searches, in the user information library, the user information; if identical user information is found, the smart terminal 5 is allowed to control the controller 2 via the communication module 1; if no identical user information is found, the smart terminal 5 is not allowed to control the controller 2 via the communication module 1.

The two-dimensional code based communication apparatus in this embodiment may implement the technical solution adopted in the above various method embodiments of the present disclosure with similar implementation principles and technical effects, which is thus not detailed here.

Figure 5:
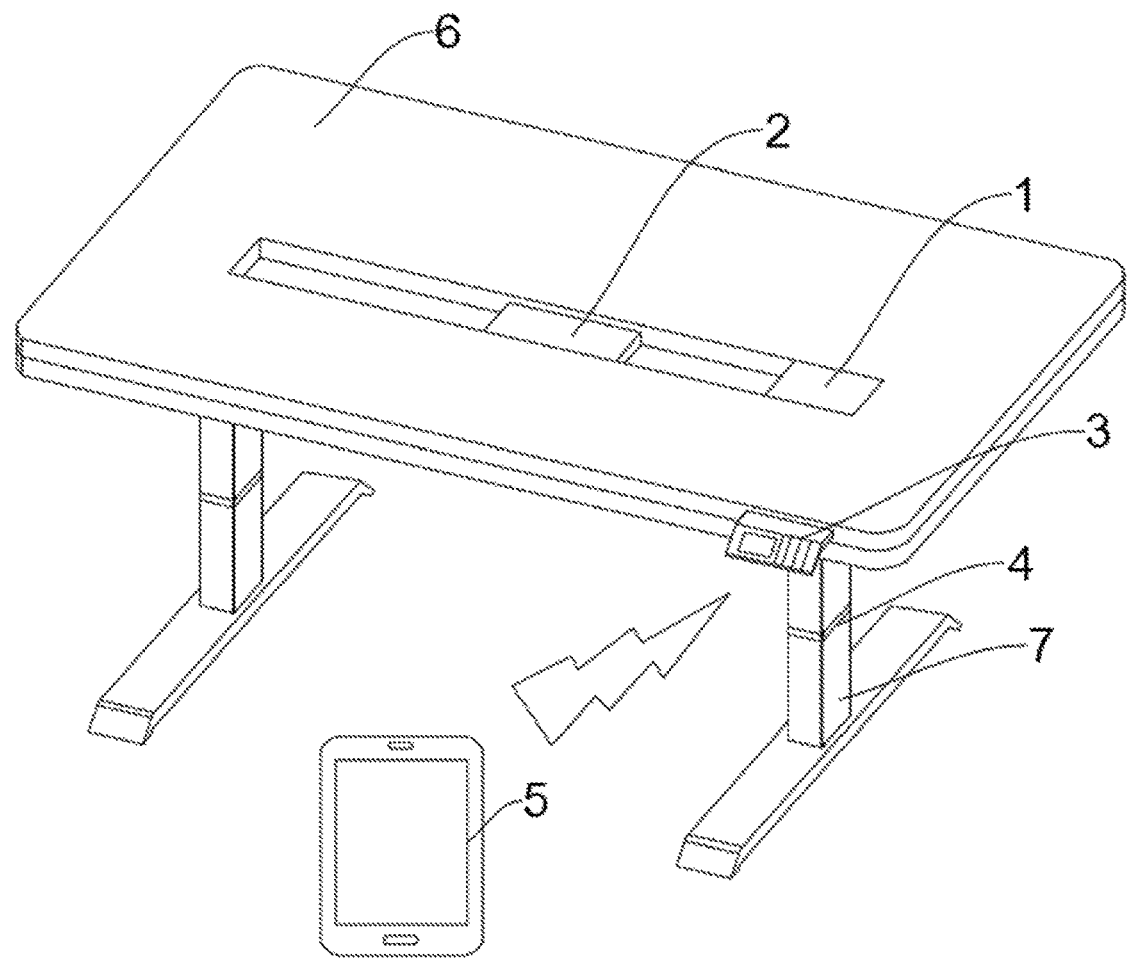
FIG. 5 is a structural schematic diagram of a lift desk according to an embodiment of the present disclosure.

In an exemplary embodiment, the present disclosure further provides a two-dimensional code based lift desk, as shown in FIG. 5, comprising: a desktop 6, a lift column 7 in connection with the desktop 6, an actuating apparatus 4 actuating the lift column to move vertically, a controller 2, a displaying module 3, and a communication module 1.

The controller 2, the communication module 1 and the displaying module 3 are mounted at the desktop 6 of the lift desk, and the actuating apparatus 4 is mounted at the lift column 7 of the lift desk to implement raising and descending of the lift desk. Upon actual use, a user scans the two-dimensional code on the desktop 6 via a smart terminal 5 to implement establishment of communication with the communication module 1, which may not only acquire product information of the lift desk, but also may transmit a control command to the controller 2 via the communication module 1 to implement elevation control of the lift desk.

The lift desk in this embodiment may implement the technical solution adopted in the above various method embodiments of the present disclosure, with similar implementation principles and technical effects, which is thus not detailed here.

It may be understood that the controller 2, the communication module 1, the displaying module 3, the actuating apparatus 4, and the smart terminal 5 in this embodiment are not limited to being mounted to a lift desk, which may also be mounted to a facility in other fields such as a medical apparatus. Their implementation principles and technical effects are similar to the lift desk and thus are not detailed here.

Those skilled in the art may make various modifications and supplementations to the described preferred embodiments or substitute them in similar manners, without departing from the spirit of the present disclosure or exceeding the scope defined in the appended claims.

What is claimed is:

1. A two-dimensional code based communication method, comprising:
    acquiring, by a controller, address information of a communication module, and transmitting the address information, together with product information, to a displaying module;
    generating, by the displaying module, a two-dimensional code based on the address information and the product information, and displaying, by the displaying module, the two-dimensional code; and
    scanning, by a smart terminal, the displayed two-dimensional code to establish communication with the communication module;
    wherein when the smart terminal establishes the communication with the communication module, the controller acquires the number of smart terminals in communicative connection with the communication module; when the number of smart terminals is greater than a set connection threshold, the controller controls the displaying module not to display the two-dimensional code.

2. The two-dimensional code based communication method according to claim 1, wherein the controller acquires the address information of the communication module, and when the address information of the communication module is updated, re-transmits the updated address information and the product information to the displaying module so as to update the two-dimensional code.

3. The two-dimensional code based communication method according to claim 1, wherein when the smart terminal establishes the communication with the communication module, the controller starts recording a communication duration between the smart terminal and the communication module; and when the communication duration is greater than a set communication duration, the controller controls the communication module to disconnect with the smart terminal.

4. The two-dimensional code based communication method according to claim 1, wherein when the smart terminal establishes the communication with the communication module, the controller acquires, via the communication module, user information of the smart terminal, and searches, in a user information library, the user information; if identical user information is found, the smart terminal is allowed to control the controller via the communication module; and if no identical user information is found, the smart terminal is not allowed to control the controller via the communication module.

5. A two-dimensional code based communication apparatus, the communication apparatus being connected to an actuating apparatus of a smart device, the communication apparatus comprises:
    a communication module configured for establishing communication with the actuating apparatus of the smart device;
    a controller configured for acquiring address information of the communication module and transmitting the address information, together with product information, to a displaying module; and
    the displaying module configured for generating a two-dimensional code based on the address information and the product information and displaying the two-dimensional code, wherein the two-dimensional code is adapted for a smart terminal to scan so as to establish the communication with the communication module;
    wherein the controller comprises a counter, wherein when the smart terminal establishes the communication with the communication module, the counter acquires the number of smart terminals in communicative connection with the communication module;
    when the number of smart terminals is greater than a set connection threshold, the controller controls the displaying module not to display the two-dimensional code.

6. The two-dimensional code based communication apparatus according to claim 5, wherein the controller acquires the address information of the communication module, and when the address information of the communication module is updated, re-transmits the updated address information and the product information to the displaying module so as to update the two-dimensional code.

7. The two-dimensional code based communication apparatus according to claim 5, wherein the controller comprises a timer for timing the communication between the smart terminal and the communication module, wherein when the smart terminal establishes the communication with the communication module, the timer tarts recording a communication duration between the smart terminal and the communication module; and when the communication duration is greater than a set communication duration, the controller controls the communication module to disconnect with the smart terminal.

8. The two-dimensional code based communication apparatus according to claim 5, wherein the controller comprises a storing module configured for storing a user information library recording user information, wherein when the smart terminal establishes the communication with the communication module, the controller acquires, via the communication module, user information of the smart terminal, and searches, in the user information library, the user information; if identical user information is found, the smart terminal is allowed to control the controller via the communication module; and if no identical user information is found, the smart terminal is not allowed to control the controller via the communication module.

* * * * *